United States Patent [19]  [11] 4,381,451
Chen et al. [45] Apr. 26, 1983

[54] CORE SELF-POWERED RADIATION DETECTOR FOR DETERMINING THERMAL AND EPITHERMAL FLUX

[75] Inventors: Cheng L. Chen, Pittsburgh; Norman P. Goldstein, Murrysville, both of Pa.; William H. Todt, Elmira Heights, N.Y.

[73] Assignee: Westinghouse Electric Corp., Pittsburgh, Pa.

[21] Appl. No.: 204,139

[22] Filed: Nov. 5, 1980

[51] Int. Cl.³ ............................................... G01T 3/00
[52] U.S. Cl. .................................................. 250/390
[58] Field of Search ...................... 250/390, 391, 392; 313/61 D; 376/254, 255

[56] References Cited
U.S. PATENT DOCUMENTS

| | | | |
|---|---|---|---|
| 3,375,370 | 3/1968 | Hilborn | 250/390 |
| 3,603,793 | 9/1971 | Warren | 250/390 |
| 3,787,697 | 1/1974 | Shields | 250/390 |
| 3,872,311 | 3/1975 | Goldstein et al. | 250/390 |
| 3,904,881 | 9/1975 | Klar et al. | 250/390 |
| 4,080,533 | 3/1978 | Todt et al. | 250/390 |
| 4,118,626 | 10/1978 | Goldstein et al. | 250/390 |

OTHER PUBLICATIONS

Goldstein, N. P. et al., "The Epithermal Component in the Neutron Response of Various Self-Powered Detectors", IEEE Transactions on Nuclear Science, Feb. 1980.

Primary Examiner—Eugene La Roche
Assistant Examiner—Janice A. Howell
Attorney, Agent, or Firm—W. G. Sutcliff

[57] ABSTRACT

A self-powered neutron detector in which two electrically isolated emitter electrodes are provided. The emitters are formed of different materials having differing responses to thermal and epithermal neutron flux. The separate signals generated between the separate emitters and a common collector electrode are used to determine the respective thermal and epithermal neutron fluxes for a more accurate flux mapping of the reactor core.

5 Claims, 3 Drawing Figures

CORE SELF-POWERED RADIATION DETECTOR FOR DETERMINING THERMAL AND EPITHERMAL FLUX

BACKGROUND OF THE INVENTION

The present invention relates to self-powered radiation detectors which are used within the core of a nuclear reactor for neutron flux mapping and to detect sudden changes in local reactivity.

A self-powered radiation detector is one in which an electrical signal is generated between an emitter and collector electrode as a function of the neutron flux without an external drive potential. The signal is produced as a result of the differing radiation response of the different metals which make up the emitter and collector. In general, such devices use a central emitter wire of a metal such as platinum, rhodium, or cobalt. An insulating means is provided about the emitter, and a coaxially disposed collector sheath of a low neutron responsive material, such as nickel-alloy Inconel, is disposed about the insulating means. The detector device is typically less than a quarter inch in diameter and easily is fitted within the fuel assembly of a reactor core.

In a typical nuclear power reactor the neutron spectrum includes a thermal neutron component with a Maxwellian distribution average energy of about KT, which is about 0.04 electron volt at 300° C. Such reactors also include an epithermal neutron component with a flux distribution that falls off as 1/E, and extends from greater than about 0.04 electron volt to about 1 mev. Each of these neutron spectrum components contribute to reactor power, but the thermal component is dominant, contributing about 85–90 percent of the power in a light water reactor of the pressurized or boiling water types. The thermal component contributes over 97 percent of the power in a heavy water reactor such as the Canadian Candu reactor.

It has recently been demonstrated that self-powered detectors respond to both thermal and epithermal neutron flux, in an article "The Epithermal Component in the Neutron Response of Various Self-Powered Detectors" in IEEE Transactions on Nuclear Science, February 1980. In a light water reactor, the signal current generated in a rhodium emitter self-powered detector is attributable equally to thermal and epithermal neutrons. In a cobalt emitter detector about 35 percent of the generated signal is due to epithermal neutrons.

It is also known that the ratio of epithermal to thermal neutron flux varies with position in the reactor core, particularly at the outer edges, as well as being variable with the age of the fuel in the core. In general, the epithermal to thermal flux ratio varies from that at the central core during fuel life by more than 20 percent over about 15–20 percent of the core volume.

The self-powered detector has been used as a neutron flux mapping tool in order to optimize reactor operation from an economic and safety viewpoint. In order to ensure accurate flux mapping the detector response to epithermal flux must also be factored into the flux mapping.

In the above mentioned recent paper, authored by the present inventors, it was shown that the signal current I from a self-powered detector can be expressed as:

$$I = \phi_{th} S_{th} + \phi_L S_{ep}$$

In the above equation detector current I is in amperes per centimeter of detector active length, $\phi_{th}$ is the total thermal flux, $S_{th}$ is the sensitivity of the detector to a thermal neutron flux expressed in amperes per neutron flux per centimeter of detector length, and $S_{ep}$ is the epithermal neutron sensitivity in the same units, and $\phi_L$ is a measure of the epithermal neutron flux expressed as epithermal neutron flux per unit lethargy. The term lethargy is a term of art referring to the neutron flux per logarithmic energy interval.

The signal current equation above can be used when signal currents are had from the self-powered detectors of the present invention to produce two simultaneous equations in two unknowns, where the unknowns are the thermal and epithermal flux. These equations can then be solved for these fluxes below:

$$\phi_{th} = \frac{I_2(S_{ep})_1 - I_1(S_{ep})_2}{(S_{ep})_1(S_{th})_2 - (S_{ep})_2(S_{th})_1}$$

$$\phi_L = \frac{I_1(S_{ep})_2 - I_2(S_{ep})_1}{(S_{ep})_1(S_{th})_2 - (S_{ep})_2(S_{th})_1}$$

In U.S. Pat. No. 3,904,881, a self-powered radiation detector is disclosed in which two different emitters are disposed in parallel within a collector sheath. The emitters comprise different materials of differing gamma sensitivity to permit gamma compensation of the output signal. A first emitter is neutron and gamma sensitive and the signal generated therefrom is compared to the separate signal from the other emitter which is gamma sensitive but substantially non-responsive to neutron flux. A variety of gamma compensation techniques are practiced in the prior art, but this is a different function than determining the thermal and epithermal neutron flux values to accurately map core conditions.

SUMMARY OF THE INVENTION

A self-powered detector is provided which is responsive to thermal and epithermal neutron flux from a nuclear reactor core to generate signal currents which more accurately measure reactor power. The detector includes two electrically separate neutron responsive emitters formed of materials with different responses to thermal and epithermal neutron flux. These two different signals are then separately measured and then compared to determine the separate thermal neutron flux and epithermal neutron flux. The signal currents from the respective emitters can be used to solve the above equation for signal current, which can be written for each emitter material with a known thermal and epithermal sensitivity for the materials. The total thermal flux and epithermal flux can then be had from the solution of the simultaneous equations which can be derived for the two separate signal currents.

DESCRIPTION OF THE PREFERRED EMBODIMENT

Figure 1:
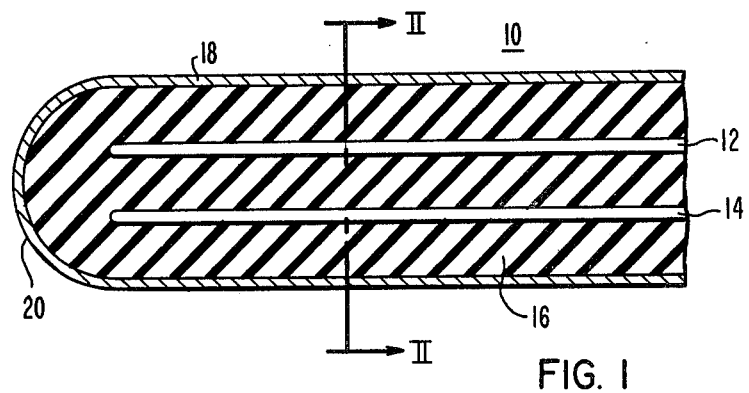
FIG. 1 is a sectioned representation in elevation of a self-powered detector of the present invention.
Figure 2:
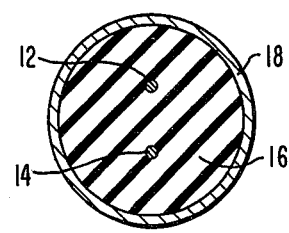
FIG. 2 is a view taken along line II—II in FIG. 1.

The self-powered detector 10 seen in FIGS. 1 and 2, comprises a pair of spaced apart emitter wires 12 and 14, surrounded by insulating means 16, and a generally tubular collector electrode 18. The collector electrode 18 is sealed at terminating end 20.

The separate emitter wires 12 and 14 are formed of two different materials which have different thermal neutron sensitivity and epithermal neutron sensitivity. The emitters 12 and 14 are by way of example formed one of rhodium, and one of cobalt. The detector 10 is disposed within the core of a nuclear reactor and electrically connected to a radiation resistant twin lead coax instrumentation cable, not shown, which is connected to a digital current meter for measuring the separate signal currents between the collector 18 and one of the emitters 12, and between the collector 18 and the other emitter 14. The digitized separate currents can then be used to compute the respective thermal neutron flux and epithermal neutron flux.

The thermal neutron sensitivity and epithermal neutron sensitivity of the rhodium and cobalt emitters have been calculated, as described in the paper mentioned above by the present inventors, and vary with the size of the emitter wire. For a typical 0.020 inch diameter emitter wire, at room temperature T=293° K., the thermal sensitivity $S_{th}$ for rhodium is $8.68 \times 10^{-22}$ A/nv/cm, and the epithermal sensitivity $S_{ep}$ is $2.94 \times 10^{-21}$ A/nv/cm. For the same diameter cobalt emitter at room temperature the thermal sensitivity is $9.52 \times 10^{-24}$ A/nv/cm, and the epithermal sensitivity is $1.86 \times 10^{-23}$ A/nv/cm. These sensitivities are dependent upon temperature and the values at standard reactor operating temperature of about 573° K. are had from the above mentioned published paper, or from experimentally reported results of others.

In producing a flux map for the reactor core it must be appreciated that the ratio of thermal flux and epithermal flux varies with position in the core, fuel burn-up, and fuel loading. After the sensitivities are obtained, using the detectors of the present invention and the simultaneous equations described previously can be solved using the sensitivities to obtain an accurate flux map for the reactor core.

The emitter wire material can be any two neutron responsive materials having different thermal and epithermal responses. The emitter material may also be platinum, rhodium wire clad with cadmium, cadmium clad with cobalt. These are materials for which the thermal and epithermal sensitivities have been determined.

The two flux components may be computed digitally, if a digital current measurement is had for the two signal currents, or computed by means of an appropriate series of operational amplifiers.

Figure 3:
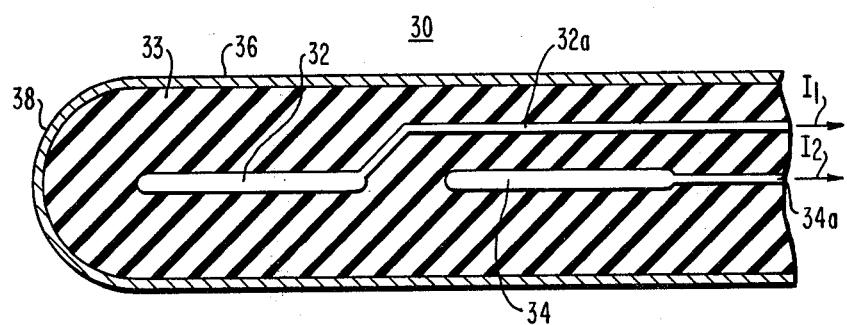
FIG. 3 is a sectioned representation in elevation of a self-powered detector of another embodiment of the invention.

In another embodiment of the invention as seen in FIG. 3, the detector 30 includes a first emitter wire 32 disposed along the longitudinal axis of the detector 30. A second emitter wire 34 is disposed in tandem along the detector longitudinal axis, but spaced from the first emitter and electrically insulated therefrom by insulating means 33. Each of the emitter 32 and 34 are electrically connected to lead wires 32a, 34a which are connected to the twin leads of an instrumentation cable, not shown. A collector electrode sheath 36 is disposed coaxial about the insulating means and emitters, with a sealed terminal end portion 38. The active emitter wires 32 and 34 have the same length, which is by way of example about 12 inches.

In the embodiment of FIG. 1, some electrical cross-talk can be expected between the conductors which requires discrimination to separate the signal currents from the neutron responses of the emitters. When rhodium and cobalt are the separate emitters the cross-talk factor can be easily determined. This is because rhodium responds to neutron flux with a 44 second half life, while the cobalt response is instantaneous. The signal measured between the collector and rhodium emitter would have an instantaneous response which is partially its own small instantaneous response and partially the cross talk from the cobalt emitter. The signal current between the collector and the cobalt emitter includes a delayed response portion which is cross-talk from the rhodium signal, with the instantaneous response being the cobalt response.

We claim:

1. A self-powered neutron detector which is responsive to thermal and epithermal neutron flux from a nuclear reactor core to generate signal currents which more accurately measure reactor power, which detector comprises two separate neutron responsive emitters of two different neutron responsive materials which have differing responses to thermal and epithermal neutron flux, insulating means about the emitter, and a relatively non-neutron responsive conductive collector about the insulating means.

2. The self-powered neutron detector set forth in claim 1, wherein the emitter metals are selected from two of the group consisting of rhodium, cobalt and platinum.

3. The self-powered neutron detector set forth in claim 1, wherein the emitter consists of two closely spaced differing neutron response metals extending in longitudinal relationship relative to the central longitudinal axis of the self powered detector.

4. The neutron detector system set forth in claim 1, wherein the self-powered detector comprises two electrically insulated emitter wires which are disposed in tandem along the longitudinal axis of the detector.

5. A method of determining the thermal and epithermal neutron flux levels in a nuclear reactor comprising:

generating a first signal current from a first neutron sensitive detector emitter disposed within the reactor which first signal current is a function of the sum of the thermal and epithermal neutron flux to which the first emitter is exposed;

generating a second signal current from a second neutron sensitive detector emitter disposed with the reactor, which has a different thermal and epithermal neutron response characteristic from that of the first neutron sensitive detector emitter, which second signal current is a function of the sum of the thermal and epithermal neutron flux to which the second emitter is exposed;

determining the separate thermal and epithermal neutron flux contributions to these first and second signal currents by solving the set of simultaneous equations which define respectively the thermal flux and epithermal flux as functions of the first and second signal current and the thermal and epithermal neutron sensitivities of the respective first and second neutron sensitive detector emitters.

* * * * *